Feb. 6, 1940. W. L. McGRATH 2,189,382
AIR CONDITIONING SYSTEM
Filed March 23, 1936
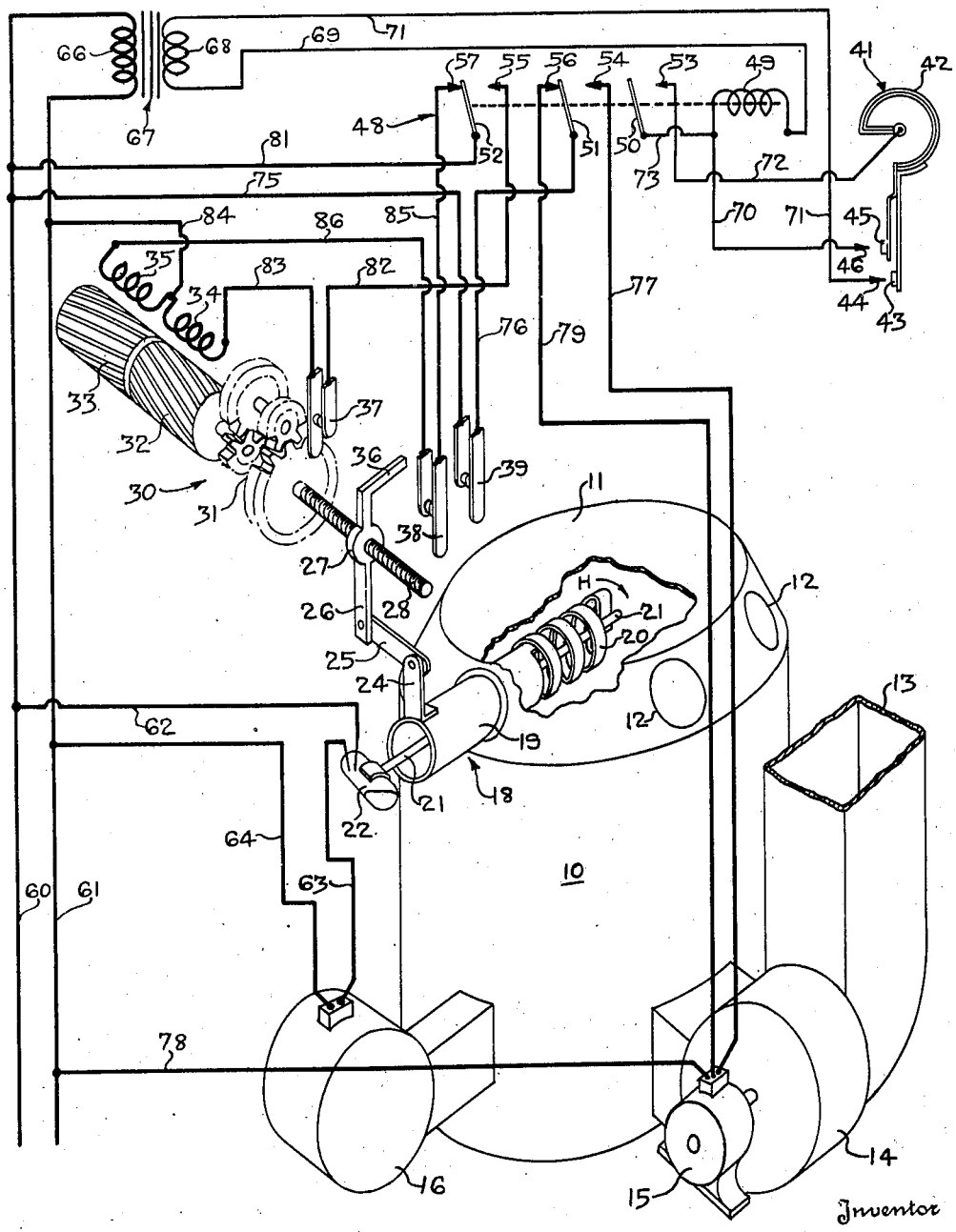
Inventor
William L. McGrath
By George H. Fisher
Attorney Patented Feb. 6, 1940

2,189,382

UNITED STATES PATENT OFFICE 2,189,382

AIR CONDITIONING SYSTEM

William L. McGrath, Minneapolis, Minn., assignor to Minneapolis-Honeywell Regulator Company, Minneapolis, Minn., a corporation of Delaware Application March 23, 1936, Serial No. 70,367

9 Claims. (Cl. 236—9)

This invention relates to air conditioning systems and more particularly to those systems of the warm air type.

It is an object of this invention to provide an air conditioning system wherein the temperature of the air being delivered to the space is adjusted in accordance with the per cent of time that there is a call for heat which is a measure of the heating load, and wherein the rate of flow of air is increased upon a call for heat and is decreased when there is no call for heat.

It is another object of this invention to provide circulating means operated at two speeds for delivering conditioned air to a space, along with means to cause a relatively high rate of circulation upon a call for heat and a relatively low rate when there is no call for heat, and means for preventing operation of the circulating means when the temperature of the air being delivered to the space varies to a given value.

Other objects and advantages will become apparent to those skilled in the art upon reference to the accompanying specification, claims and drawing, in which drawing is diagrammatically disclosed the preferred form of my invention.

For purposes of illustration I have shown a warm air furnace at 10, having a bonnet 11 which is equipped with openings 12 capable of receiving ducts leading to the space or spaces to be conditioned, not shown. Air is returned from the space or spaces to be conditioned through a return air duct 13 by a fan 14 operated by a two-speed motor 15. The return air is delivered into the warm air furnace 10 to be re-heated and again circulated to the space to be heated. The warm air furnace may be heated or fired by an oil burner designated at 16 having the usual safety devices, not shown.

Located in the bonnet 11 of the warm air furnace 10 and responsive to the temperature of the air contained therein is an adjustable bonnet thermostat generally designated at 18. This bonnet thermostat 18 is shown to comprise, for purposes of illustration, a rotatably adjustable sleeve 19 carrying one end of a bimetallic helix 20. The other end of the bimetallic helix 20 is connected to a torque rod 21 upon which is suitably mounted a mercury switch 22. The arrangement is such that an increase in bonnet temperature causes clockwise movement of the torque rod 21 in the direction indicated by the character H, and likewise clockwise movement of the mercury switch 22. Upon a decrease in bonnet temperature the switch 22 is rotated in a counter-clockwise direction to cause bridging of the contacts therein.

The sleeve 19 of the bonnet thermostat 18 carries a lever 24 which is connected by means of a link 25 to an extension 26 of a nut 27 mounted on a screw 28. The screw 28 is rotated in either direction by means of a reversing motor generally designated at 30 through a reduction gear train 31. The motor 30 may comprise rotors 32 and 33 operated by field windings 34 and 35. The arrangement is such that when the field winding 34 is energized the nut 27 is moved to the left to rotate the sleeve 19 of the bonnet thermostat 18 in a counter-clockwise direction to raise the setting of the bonnet thermostat 18. When the field winding 35 is energized, the nut 27 is moved to the right to cause clockwise rotation of the sleeve 19 to lower the setting of the bonnet thermostat 18.

The nut 27 also carries an abutment 36 which is adapted to engage a limit switch 37 at one extreme limit of its movement and to engage a limit switch 38 and a fan switch 39 at the other extreme limit of its movement.

Located in the space to be conditioned is a space thermostat generally designated at 41, which may comprise a bimetallic element 42 for operating contacts 43 and 45 with respect to stationary contacts 44 and 46. The arrangement is such that upon a decrease in space temperature the contact 43 is first moved into engagement with the contact 44 and then the contact 45 is moved into engagement with the contact 46. For purposes of illustration it is assumed that the contact 43 engages the contact 44 at a space temperature of 72° and the contact 45 engages the contact 46 at a space temperature of 70°.

A relay is generally designated at 48 and this relay may comprise a relay coil 49 for operating switch arms 50, 51 and 52. The arrangement is such that when the relay coil 49 is energized the switch arms 50, 51 and 52 are moved into engagement with contacts 53, 54 and 55 respectively. When the relay coil 49 is deenergized, the switch arms 50, 51 and 52 are moved out of engagement with their respective contacts and the switch arms 51 and 52 are moved into engagement with contacts 56 and 57 respectively. This last mentioned movement of the switch arms may be accomplished by means of springs, gravity or other means, not shown.

Line wires leading from some source of power, not shown, are designated at 60 and 61. The line wire 60 is connected by a wire 62 to one of the electrodes of the mercury switch 22. The other electrode thereof is connected by a wire 63 to the oil burner 16 which in turn is connected by a wire 64 to the other line wire 61. When the bonnet temperature decreases to a given value as determined by the setting of the thermostat 18 so as to move the mercury switch 22 to a circuit making position, a circuit is completed from the line wire 60, through wire 62, mercury switch 22, wire 63, oil burner 16 and wire 64 back to the other line wire 61. Completion of this circuit causes energization of the oil burner 16. When the bonnet temperature rises above this predetermined value by reason of the operation of the oil burner 16, mercury switch 22 is moved to a circuit breaking position to stop operation of the oil burner 16. In this manner the bonnet temperature is maintained at a desired value in accordance with the adjustment of the bonnet thermostat 18.

A primary 66 of a step-down transformer 67 having a secondary 68 is connected across the line wires 60 and 61. One end of the secondary 68 is connected by a wire 69 to one end of the relay coil 49. The other end of the relay coil 49 is connected by a wire 70 to the contact 46 of the space thermostat 41. The contact 44 is connected by wire 71 to the other end of the secondary 68. The bimetallic element 42 of the space thermostat 41 is connected by a wire 72 to the contact 53 of the relay 48. The switch arm 50 cooperating with the contact 53 is connected by a wire 73 to the junction of wire 70 and relay coil 49. When the space temperature decreases to 72°, the contact 43 is moved into engagement with the contact 44 and when the space temperature decreases to 70°, the contact 45 is moved into engagement with the contact 46. This completes a circuit from the secondary 68 through wire 71, contacts 44, 43, 45 and 46, wire 70, relay coil 49 and wire 69 back to the secondary 68. Completion of this circuit causes energization of the relay coil 49 to move the switch arms 50, 51 and 52 into engagement with the contacts 53, 54 and 55 respectively. Movement of the switch arm 50 into engagement with the contact 53 completes a maintaining circuit for the relay coil 49 which may be traced from the secondary 68 through wire 71, contacts 44 and 43, bimetallic element 42, wire 72, contact 53, switch arm 50, wire 73, relay coil 49 and wire 69 back to the secondary 68. Completion of this circuit maintains the relay coil 49 energized until such time as the space temperature shall rise to 72° to break contact between the contacts 43 and 44.

The line wire 60 is connected by a wire 75, fan switch 39 and a wire 76, to the switch arm 51 of the relay 48. The contact 54 is connected by a wire 77 to the two-speed fan motor 15 which in turn is connected by wire 78 to the other line wire 61. The contact 56 of the relay 48 is connected by a wire 79 to the two-speed fan motor 15. When the relay coil 49 is energized upon a call for heat in the manner pointed out above the switch arm 51 is moved into engagement with the contact 54 to complete a circuit from the line wire 60, through wire 75, fan switch 39, wire 76, switch arm 51, contact 54, wire 77, two-speed fan motor 15 and wire 78 back to the other line wire 61. Completion of this circuit causes high speed operation of the fan motor 15. When the space thermostat is satisfied so as to cause deenergization of the relay coil 49, the switch arm 51 moves into engagement with the contact 56 to complete a circuit from the line wire 60, through wire 75, fan switch 39, wire 76, switch arm 51, contact 56, wire 79, fan motor 15 and wire 78 back to the other line wire 61. Completion of this circuit causes slow speed operation of the fan 14. Therefore, when there is a demand for heat, the fan 14 is operated at high speed and when there is no demand for heat, the fan 14 is operated at low speed. It is noted at this point that both the high speed and low speed circuits to the fan motor 15 include the fan switch 39, so that when the bonnet thermostat 18 is adjusted to a low temperature setting the fan switch 39 is opened to prevent operation of the fan 14. Since the bonnet temperature follows closely the temperature setting of the bonnet thermostat 18 the fan 14 is therefore prevented from operating when the bonnet temperature decreases below a given value. If under certain conditions the bonnet temperature should not follow closely the setting of the bonnet thermostat 18 so as to stop operation of the fan 14 when the bonnet temperature decreases to a predetermined value, a conventional fan switch responsive to bonnet temperature and known in the art may be substituted for the fan switch 39 illustrated.

The line wire 60 is connected by a wire 81 to the switch arm 52 of the relay 48. The contact 55 associated with the switch arm 52 is connected by a wire 82, the limit switch 37 and a wire 83 to one end of the field winding 34. The other end of the field winding 34 is connected by a wire 84 to the other line wire 61. The contact 57 of the relay 48 is connected by a wire 85, the limit switch 38 and a wire 86 to one end of the field winding 35. The other end of the field winding 35 is connected to the field winding 34 and by a wire 84 to the line wire 61. When the switch arm 52 is moved into engagement with the contact 55 upon a call for heat in the manner pointed out above, a circuit is completed from the line wire 60, through wire 81, switch arm 52, contact 55, wire 82, limit switch 37, wire 83, field winding 34 and wire 84 back to the other line wire 61. Completion of this circuit causes energization of the field winding 34 to cause gradual raising of the setting of the bonnet thermostat 18. When the space thermostat 41 is satisfied, switch arm 52 moves into engagement with the contact 57 to complete a circuit from the line wire 60 through wire 81, switch arm 52, contact 57, wire 85, limit switch 38, wire 86, field winding 35 and wire 84 back to the other line wire 61. Completion of this circuit causes energization of the field winding 35 to lower gradually the setting of the bonnet thermostat 18.

Summarizing the operation, it is seen that the bonnet thermostat 18 controls the oil burner 16 to maintain the bonnet temperature at a value corresponding to the adjustment or setting of the bonnet thermostat 18. When the space temperature decreases to 70°, the rate of flow of warm air directed to the space is increased to increase the space temperature. When the space temperature rises to 70° in response to this increased rate of flow, the speed of the fan 14 is decreased to decrease the rate of flow of heated air to the space, whereby the space temperature is allowed to decrease. Also when the space thermostat 41 is calling for heat, the bonnet thermostat 18 and consequently the bonnet temperature is being adjusted upwardly and when the space thermostat 41 is satisfied the bonnet thermostat 18 and consequently the bonnet temperature is being adjusted downwardly. Since the per cent of time that the space thermostat is calling for heat forms an accurate indication of the heating load on the system and since the bonnet thermostat 18 is adjusted upwardly or downwardly in accordance with the per cent of time that the space thermostat is calling for heat or is satisfied, the bonnet thermostat 18 and consequently the bonnet temperature is adjusted directly in accordance with the load on the heating system. Therefore, as the heating load increases, the bonnet temperature is increased to supply additional heat to the space to maintain the space temperature within predetermined limits, 70° to 72° as illustrated. Likewise, as the heating load decreases the bonnet temperature is decreased to decrease the supply of heat being delivered to the space to maintain the space temperature within the predetermined limits. When the correct amount of heat is being supplied to the space to maintain the space temperature within predetermined limits, there will be equal "on" and "off" operations of the space thermostat 41 whereby the nut 27 is moved to the left and to the right in equal amounts. This will maintain the bonnet temperature at the desired value to supply the correct amount of heat to the space to be heated. As the space temperature decreases the rate of flow of heated air at this temperature is increased to supply additional heat to the space to restore the space temperature to normal, and when the space thermostat 41 is satisfied the rate of flow of heated air at this temperature is decreased. Stated broadly, the bonnet temperature is maintained at a value to supply the correct amount of heat to the space to maintain the space temperature at the desired value, and as the space temperature decreases the rate of flow of air at this temperature is increased and as the space temperature increases the rate of flow of air at this temperature is decreased.

When the heating load decreases, the bonnet temperature is automatically decreased in accordance with the decrease in heating load. If the bonnet temperature should be decreased to such a value as to cause relatively cool air to be delivered to the space which, under certain circumstances, might cause drafts in the space, the fan switch 39 stops operation of the fan 14 to prevent these objectionable cool drafts.

Although I have disclosed definite temperature values for purposes of illustration, other temperature values may be used and still remain within the contemplation of this invention. Also I have disclosed my invention as applied to a warm air heating system but it is equally applicable to plenary type heating systems, and such systems are within the contemplation of this invention. Further, this invention might be equally as well applied to summer cooling as well as winter heating and merely involves the substitution of a cooling means for heating means and reversal of the various thermostats. The use of my system in connection with summer cooling apparatus is also within the contemplation of this invention. In view of the above my invention is to be limited only by the scope of the appended claims and prior art.

I claim as my invention:

1. In a heating system of the class described, the combination of a warm air heating means having a bonnet, means for changing the temperature of said bonnet, means for circulating air at different rates through the bonnet and the space to be heated, a thermostat responsive to space temperatures to cause said circulating means to circulate air at a high rate upon a call for heat and to cause said circulating means to operate at a low rate when the thermostat is satisfied, means responsive to bonnet temperatures to control the operation of the temperature changing means, means for continually adjusting the bonnet temperature responsive means to cause the temperature changing means to maintain increasingly higher bonnet temperatures while the thermostat is calling for heat, and means for continually adjusting the bonnet temperature responsive means to cause the temperature changing means to maintain increasingly lower bonnet temperatures during the time the thermostat is not calling for heat, whereby a substantially constant average temperature is maintained in the space to be heated.

2. In a heating system of the class described, the combination of means for circulating a heating fluid to a space at different rates, heating means for heating said fluid, space temperature responsive means controlling said fluid circulating means and causing circulation of fluid at a high rate in response to a call for heat by said space temperature responsive means and causing circulation of fluid at a low rate in response to said space temperature responsive means becoming satisfied, means responsive to the temperature of the heating fluid in control of said heating means to cause the temperature of the heating fluid to be maintained at a predetermined value, and means responsive to the space temperature responsive means becoming satisfied for gradually adjusting said fluid temperature responsive means downwardly.

3. In a heating system of the class described, the combination of means for circulating a heating fluid to a space at different rates, heating means for heating said fluid, space temperature responsive means controlling said fluid circulating means and causing circulation of fluid at a high rate in response to a call for heat by said space temperature responsive means and causing circulation of fluid at a low rate in response to said space temperature responsive means becoming satisfied, means responsive to the temperature of the heating fluid in control of said heating means to cause the temperature of the heating fluid to be maintained at a predetermined value, means responsive to the space temperature responsive means becoming satisfied for gradually adjusting said fluid temperature responsive means downwardly, and means responsive to adjustment of the fluid temperature responsive means to a low predetermined value to interrupt operation of the fluid circulating means.

4. In a heating system of the class described, the combination of means for circulating a heating fluid to a space at different rates, heating means for heating said fluid, space temperature responsive means controlling said fluid circulating means and causing circulation of fluid at a high rate in response to a call for heat by said space temperature responsive means and causing circulation of fluid at a low rate in response to said space temperature responsive means becoming satisfied, means responsive to the temperature of the heating fluid in control of said heating means to cause the temperature of the heating fluid to be maintained at a predetermined value, means responsive to the space temperature responsive means becoming satisfied for gradually adjusting said fluid temperature responsive means downwardly, and means responsive to a call for heat by the space temperature responsive means for gradually adjusting said fluid temperature responsive means upwardly.

5. In a heating system, the combination of a warm air heating means, means for circulating warm air at different rates to a space to be heated, means responsive to space temperature for controlling said circulating means to increase the rate of circulation upon a call for heat by the thermostatic means and to decrease the rate of circulation when the thermostatic means is satisfied, heating means for raising the temperature of the air being circulated, means responsive to the temperature of the air being circulated in control of said heating means, and means for lowering the setting of said last named temperature responsive means by an amount which is proportional to the percent of time the space temperature responsive means is satisfied.

6. In a heating system, the combination of a warm air heating means, means for circulating warm air at different rates to a space to be heated, means responsive to space temperature for controlling said circulating means to increase the rate of circulation upon a call for heat by the thermostatic means and to decrease the rate of circulation when the thermostatic means is satisfied, heating means for raising the temperature of the air being circulated, means responsive to the temperature of the air being circulated in control of said heating means, and means for raising the setting of said last named temperature responsive means by an amount which is proportional to the percent of time the space temperature responsive means is calling for heat.

7. In a heating system, the combination of a warm air heating means, means for circulating warm air at different rates to a space to be heated, means responsive to space temperature for controlling said circulating means to increase the rate of circulation upon a call for heat by the thermostatic means and to decrease the rate of circulation when the thermostatic means is satisfied, heating means for raising the temperature of the air being circulated, means responsive to the temperature of the air being circulated in control of said heating means, means for lowering the setting of said last named temperature responsive means by an amount which is proportional to the percent of time the space temperature responsive means is satisfied, and for raising the setting of said last named temperature responsive means by an amount which is proportional to the percent of time the space temperature respsonsive means is calling for heat.

8. In a heating system, the combination of a warm air heating means, means for circulating warm air at different rates to a space to be heated, means responsive to space temperature for controlling said circulating means to increase the rate of circulation upon a call for heat by the thermostatic means and to decrease the rate of circulation when the thermostatic means is satisfied, heating means for raising the temperature of the air being circulated, means responsive to the temperature of the air being circulated in control of said heating means, means for lowering the setting of said last named temperature responsive means by an amount which is proportional to the percent of time the space temperature responsive means is satisfied, and for raising the setting of said last named temperature responsive means by an amount which is proportional to the percent of time the space temperature responsive means is calling for heat, and means responsive to the lowering of the setting of said last named temperature responsive means to a predetermined value for stopping operation of the circulating means.

9. In an air conditioning system, the combination of conditioning means, means for controlling the circulation of conditioned air from the conditioning means to a space to be conditioned, means for changing the condition of the air being circulated, means responsive to the condition of the air in control of said condition changing means to maintain the condition thereof at predetermined values, means responsive to the condition of the space for increasing the circulation of the conditioned air upon a call for conditioning and for decreasing the circulation of the conditioned air when the condition responsive means is satisfied, means operated by the space condition responsive means for continuously adjusting the setting of the air condition responsive means in a direction which is dependent upon whether the space condition responsive means is calling for conditioning or is satisfied, and means responsive to adjustment of said air condition responsive means to a predetermined value to further decrease the circulation of the conditioned air.

WILLIAM L. McGRATH.